(12) United States Patent
Wang et al.

(10) Patent No.: US 11,983,407 B2
(45) Date of Patent: May 14, 2024

(54) ENHANCED DATA COMPRESSION IN DISTRIBUTED DATASTORES

(71) Applicant: VMare LLC, Palo Alto, CA (US)

(72) Inventors: Wenguang Wang, Palo Alto, CA (US); Vamsi Gunturu, Palo Alto, CA (US)

(73) Assignee: VMare LLC, Palo Alto, CA (US)

(*) Notice: Subject to any disclaimer, the term of this patent is extended or adjusted under 35 U.S.C. 154(b) by 414 days.

(21) Appl. No.: 16/827,618

(22) Filed: Mar. 23, 2020

(65) Prior Publication Data
US 2021/0294499 A1 Sep. 23, 2021

(51) Int. Cl.
G06F 3/06 (2006.01)

(52) U.S. Cl.
CPC ............ *G06F 3/0608* (2013.01); *G06F 3/064* (2013.01); *G06F 3/0659* (2013.01); *G06F 3/067* (2013.01)

(58) Field of Classification Search
CPC ...... G06F 3/0608; G06F 3/064; G06F 3/0659; G06F 3/067
See application file for complete search history.

(56) References Cited

U.S. PATENT DOCUMENTS

| | | | | |
|---|---|---|---|---|
| 7,254,591 | B2* | 8/2007 | Ting | G06F 16/972 |
| 2012/0284587 | A1* | 11/2012 | Yu | G06F 3/0631 |
| | | | | 714/773 |
| 2014/0032836 | A1* | 1/2014 | Pan | G06F 3/0679 |
| | | | | 711/114 |
| 2016/0335188 | A1* | 11/2016 | Romanovskiy | G06F 3/064 |
| 2016/0342520 | A1* | 11/2016 | Patil | G06F 12/0866 |
| 2018/0081591 | A1* | 3/2018 | Maheshwari | G06F 3/0685 |
| 2020/0341639 | A1* | 10/2020 | Cason | G06F 3/0644 |

* cited by examiner

*Primary Examiner* — Nanci N Wong
(74) *Attorney, Agent, or Firm* — King Intellectual Asset Management

(57) ABSTRACT

A method for performing write operations on a set of one or more physical disks of a set of one or more host machines is provided. The method receives a data block to write on at least one physical disk in the set of physical disks and generates a first set of one or more compressed sectors based on the received data block. The method writes (i) a first entry having a first header and the first set of compressed sectors to a data log that is maintained in a cache, and (ii) the first set of compressed sectors to a bank in memory. The method further determines if a size of data including compressed sectors in the bank satisfies a threshold, and when the size of data in the bank satisfies the threshold, writes the data to the at least one physical disk in the set of physical disks.

17 Claims, 10 Drawing Sheets

US 11,983,407 B2

ENHANCED DATA COMPRESSION IN DISTRIBUTED DATASTORES

RELATED APPLICATIONS

This application is related to U.S. application Ser. No. 16/827,648, issued as U.S. Pat. No. 11,204,706, titled "ENHANCED HASH CALCULATION IN DISTRIBUTED DATASTORES," U.S. application Ser. No. 16/827,674, issued as U.S. Pat. No. 11,061,594, titled "ENHANCED DATA ENCRYPTION IN DISTRIBUTED DATASTORES USING A CLUSTER-WIDE FIXED RANDOM TWEAK," and U.S. application Ser. No. 16/827,692, issued as U.S. Pat. No. 11,573,711, titled "ENHANCED DATA ENCRYPTION IN DISTRIBUTED DATASTORES USING RANDOM TWEAKS STORED IN DATA BLOCKS." Each of these applications is filed on the same day as the present application. The entire contents of each of these applications are hereby incorporated by reference herein.

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operations.

A distributed object-based datastore, such as a virtual storage area network (vSAN) datastore, may store data blocks received from a user (e.g., a virtual machine (VM) of a client) in multiple layers at different times. For example, in a vSAN datastore, the data blocks may be saved in a first layer (e.g., the performance tier) and transferred (at a later time) to another layer (e.g., the capacity tier). Access to the data in the first layer (e.g., held in a cache object) may be substantially faster than the other layer, and as such, the vSAN datastore may keep the hot data (e.g., data that needs to be accessed more frequently) in the performance tier before the data gets cold (e.g., less frequently accessed, or not accessed) and be transferred to the capacity tear. In distributed datastores, such as vSAN, the data in the data blocks may not be compressed before getting transferred to the first layer. Therefore, the datastore would need to read the data from the first layer, compress the data, and then write the compressed data to the second tier. If the datastore uses mirroring, the same compression process would need to be performed on data for every copy of data in each mirror. This approach requires significant CPU cost for each different compression process. It may require more network and disk bandwidth than transferring and writing uncompressed data over network if the data is compressible.

DETAILED DESCRIPTION

In order to store data blocks received, for example, from a virtual machine (VM) of a user, a distributed datastore (e.g., a virtual storage area network (vSAN) datastore) may use different layers of storage. For example, the vSAN datastore may store data in the received data blocks in a first data storage (e.g., in the performance tier) for quicker access, and later store the data in a second data storage (e.g., in the capacity tier) that may be accessed less than the first data storage. The datastore, in some hosting systems, may store the data in a first object (e.g., the MetaObj) in the performance tier without compressing the data, and then compress the data before storing the data in a second object (e.g., CapObj) in the capacity tier.

Some embodiments provide an efficient compression process that uses the central processing unit(s) (CPUs) and network bandwidth of the hosting system more efficiently. Some such embodiments may compress the data received in the data blocks, generate metadata that describes the compressed data, and store the compressed data and the associated metadata as an entry of a data log of the MetaObj maintained in the performance tier. One embodiment may also write the compressed data to one or more physical memories (e.g., of one or more host machines of the hosting system), such as random access memory (RAM). Once the compressed data stored in the physical memory reaches a threshold size, some embodiments may flush the data stored in the physical memory to the CapObj in the capacity tier. In some embodiments, the threshold size may be equal to the size of a full stripe (or segment) that may include several data blocks spread across one or more physical disks of one or more host machines. Some embodiments may use three-way mirroring redundant array of independent disks 1 (RAID 1) to write to the MetaObj in the performance tier, and four (data blocks)+two (parity blocks) RAID 6 for writing full stripes to the CapObj in the capacity tier.

By compressing the data in the data log before writing the data as full stripes to the CapObj, some embodiments may reduce the CPU cost significantly, because, for example, less data may be written to the data log, and each mirrored disk may receive and store compressed data, instead of compressing the data individually on each separate disk (after the decompressed mirrored data is saved to the individual disks). Additionally, some embodiments may decrease the network and disk write bandwidth substantially, because, for example, less data needs to be transferred and/or exchanged between the different nodes of the hosting system that host the MetaObj and the CapObj.

Figure 1:
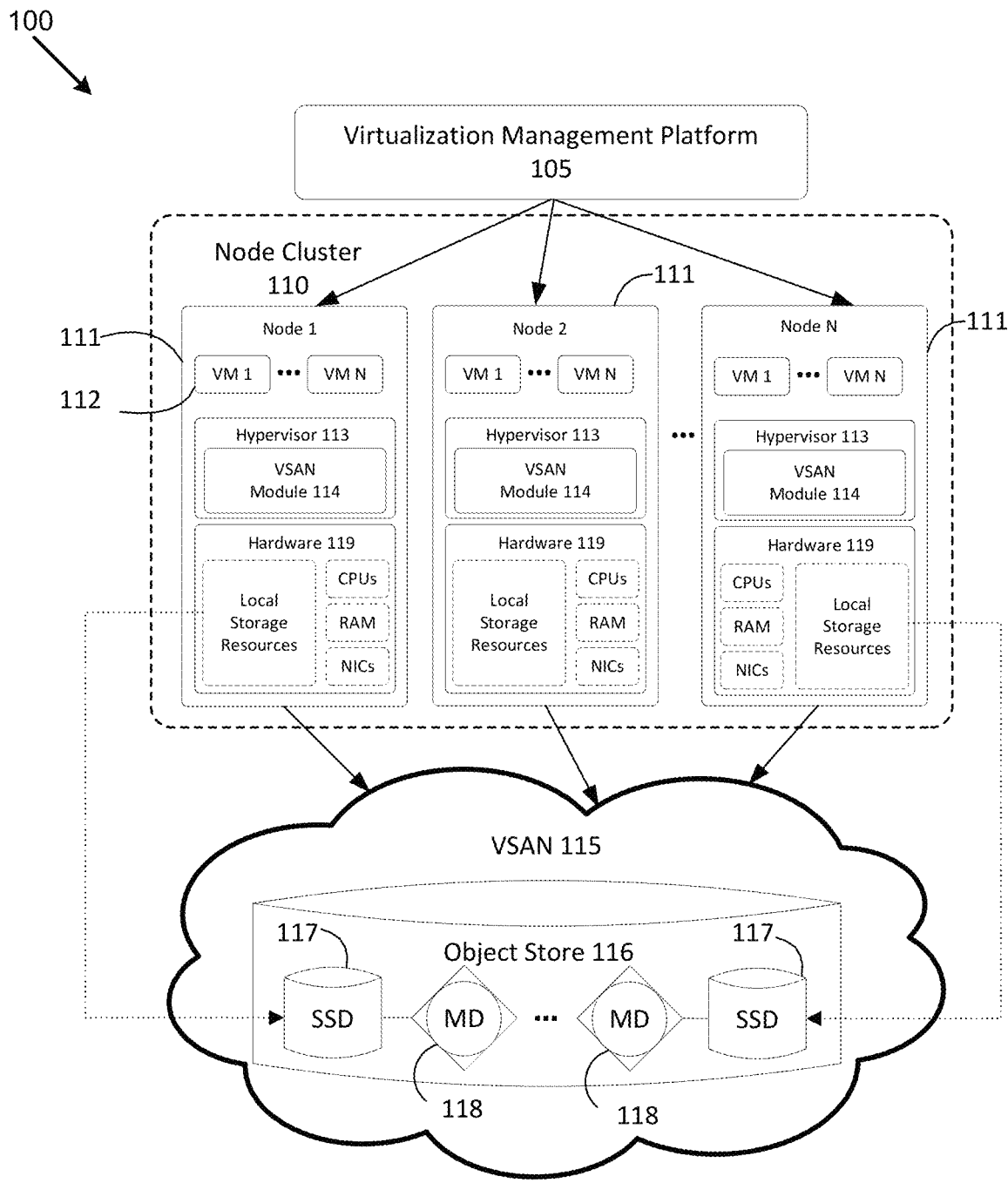
FIG. 1 is a diagram illustrating an example computing environment in which embodiments of the present application may be practiced.

FIG. 1 is a diagram illustrating an example computing environment 100 in which embodiments of the present application may be practiced. As shown, computing environment 100 includes a distributed object-based datastore, such as a software-based "virtual storage area network" (vSAN) environment that leverages the commodity local storage housed in or directly attached (hereinafter, use of the term "housed in" or "housed in" may be used to encompass both housed in, or otherwise directly attached) to host machines/servers or nodes 111 of a cluster 110 to provide an aggregate object store 116 to virtual machines (VMs) 112 running on the nodes. The local commodity storage housed in the nodes 111 may include combinations of solid state drives (SSDs) or non-volatile memory express (NVMe) drives 117, magnetic or spinning disks or slower/cheaper SSDs 118, or other types of storages.

In certain embodiments, SSDs 117 serve as a read cache and/or write buffer (e.g., in the performance tier) in front of magnetic disks or slower/cheaper SSDs 118 (e.g., in the capacity tier) to enhance the I/O performance. In certain other embodiments, both performance and capacity tiers may leverage the same type of storage (e.g., SSDs) for storing the data and performing the read/write operations. Additionally, it should be noted that SSDs 117 may include different types of SSDs that may be used in different layers (tiers) in some embodiments. For example, in some embodiments, the data in the performance tier may be written on a single-level cell (SLC) type of SSD, while the capacity tier may use a quad-level cell (QLC) type of SSD for storing the data.

As further discussed below, each node 111 may include a storage management module (referred to herein as a "vSAN module") in order to automate storage management workflows (e.g., create objects in the object store, etc.) and provide access to objects in the object store (e.g., handle I/O operations on objects in the object store, etc.) based on predefined storage policies specified for objects in the object store. For example, because a VM may be initially configured by an administrator to have specific storage requirements for its "virtual disk" depending on its intended use (e.g., capacity, availability, input/output operations per second (IOPS), etc.), the administrator may define a storage profile or policy for each VM specifying such availability, capacity, IOPS and the like. As further described below, the vSAN module may then create an "object" for the specified virtual disk by backing it with physical storage resources of the object store based on the defined policy.

A virtualization management platform 105 is associated with cluster 110 of nodes 111. Virtualization management platform 105 enables an administrator to manage the configuration and spawning of VMs on the various nodes 111.

As depicted in the embodiment of FIG. 1, each node 111 includes a virtualization layer or hypervisor 113, a vSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described below, each hypervisor 113, through its corresponding vSAN module 114, may provide access to storage resources located in hardware 119 (e.g., SSDs 117 and magnetic disks 118) for use as storage for storage objects, such as virtual disks (or portions thereof) and other related files that may be accessed by any VM 112 residing in any of nodes 111 in cluster 110.

In one embodiment, vSAN module 114 may be implemented as a "vSAN" device driver within hypervisor 113. In such an embodiment, vSAN module 114 may provide access to a conceptual "vSAN" 115 through which an administrator can create a number of top-level "device" or namespace objects that are backed by object store 116. For example, during creation of a device object, the administrator may specify a particular file system for the device object (such device objects may also be referred to as "file system objects" hereinafter) such that, during a boot process, each hypervisor 113 in each node 111 may discover a /vsan/ root node for a conceptual global namespace that is exposed by vSAN module 114. By accessing APIs exposed by vSAN module 114, hypervisor 113 may then determine all the top-level file system objects (or other types of top-level device objects) currently residing in vSAN 115.

When a VM (or other client) attempts to access one of the file system objects, hypervisor 113 may then dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through vSAN 115 may, for example, be implemented to emulate the semantics of a particular file system, such as a distributed (or clustered) virtual machine file system (VMFS) provided by VMware Inc. VMFS is designed to provide concurrency control among simultaneously accessing VMs. Because vSAN 115 supports multiple file system objects, it is able to provide storage resources through object store 116 without being confined by limitations of any particular clustered file system. For example, many clustered file systems may only scale to support a certain amount of nodes 111. By providing multiple top-level file system object support, vSAN 115 may overcome the scalability limitations of such clustered file systems.

As described in further detail in the context of FIG. 2 below, a file system object may, itself, provide access to a number of virtual disk descriptor files accessible by VMs 112 running in cluster 110. These virtual disk descriptor files may contain references to virtual disk "objects" that contain the actual data for the virtual disk and are separately backed by object store 116. A virtual disk object may itself be a hierarchical, "composite" object that is further composed of "component" objects (again separately backed by object store 116) that reflect the storage requirements (e.g., capacity, availability, IOPs, etc.) of a corresponding storage profile or policy generated by the administrator when initially creating the virtual disk. Each vSAN module 114 (through a cluster level object management or "CLOM" sub-module, in embodiments as further described below) may communicate with other vSAN modules 114 of other nodes 111 to create and maintain an in-memory metadata database (e.g., maintained separately but in synchronized fashion in the memory of each node 111) that may contain metadata describing the locations, configurations, policies and relationships among the various objects stored in object store 116.

This in-memory metadata database is utilized by a vSAN module 114 on a node 111, for example, when a user (e.g., an administrator) first creates a virtual disk for a VM as well as when the VM is running and performing I/O operations (e.g., read or write) on the virtual disk. As further discussed below in the context of FIG. 3, vSAN module 114 (through a distributed object manager or "DOM" sub-module, in one embodiment as further described below) may traverse a hierarchy of objects using the metadata in the in-memory database in order to properly route an I/O operation request to the node (or nodes) that houses (house) the actual physical local storage that backs the portion of the virtual disk that is subject to the I/O operation.

In some embodiments, one or more nodes 111 of node cluster 110 may be located at a geographical site that is distinct from the geographical site where the rest of nodes 111 are located. For example, some nodes 111 of node cluster 110 may be located at building A while other nodes may be located at building B. In another example, the geographical sites may be more remote such that one geographical site is located in one city or country and the other geographical site is located in another city or country. In such embodiments, any communications (e.g., I/O operations) between the DOM sub-module of a node at one geographical site and the DOM sub-module of a node at the other remote geographical site may be performed through a network, such as a wide area network ("WAN").

Figure 2:
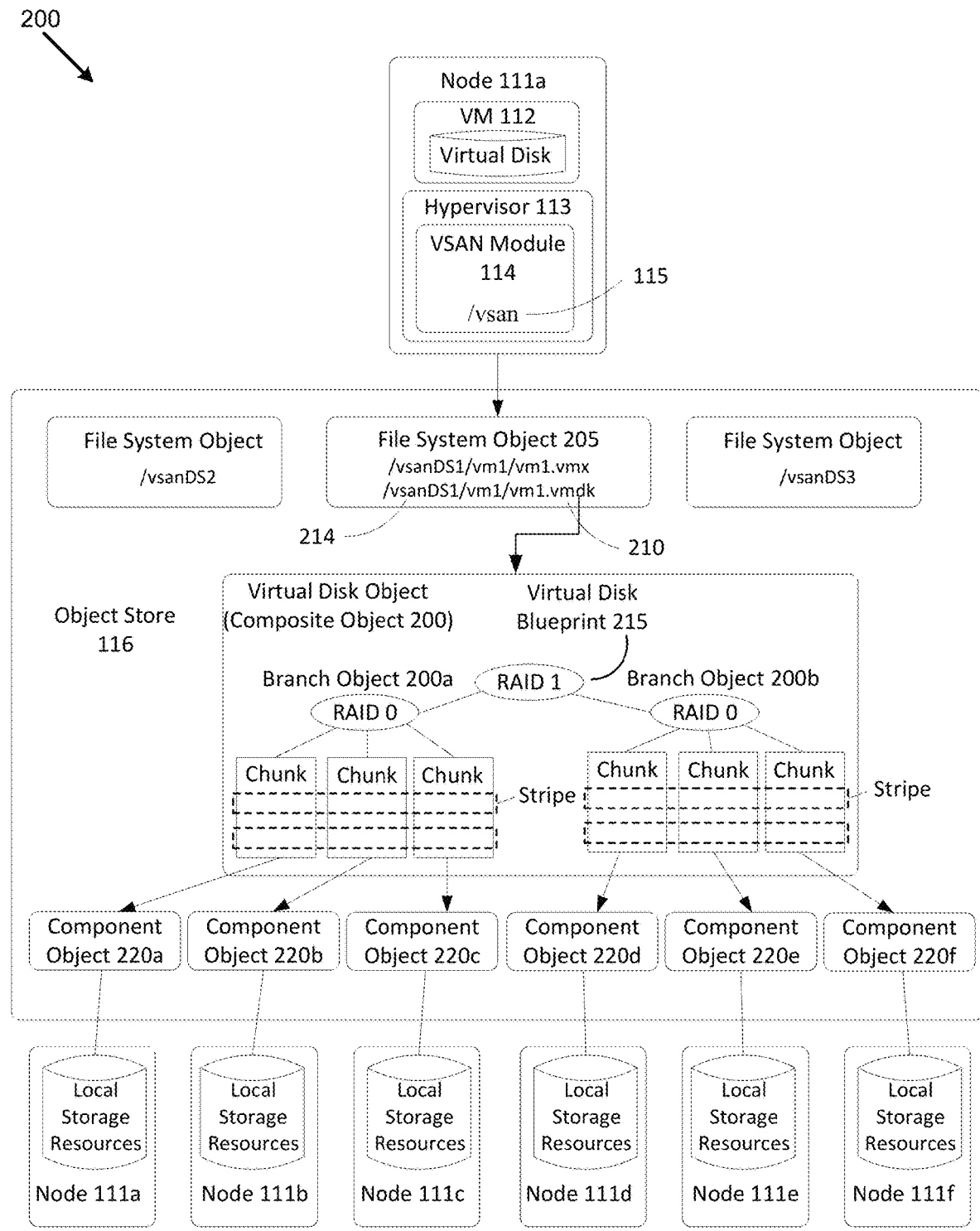
FIG. 2 is a diagram illustrating an example hierarchical structure of objects organized within an object store that represent a virtual disk, according to an example embodiment of the present application.

FIG. 2 is a diagram 200 illustrating an example hierarchical structure of objects organized within an object store 116 that represent a virtual disk, according to an example embodiment of the present application. As previously discussed above, a VM 112 running on one of nodes 111 may perform I/O operations on a virtual disk that is stored as a hierarchical composite object 200 in object store 116. Hypervisor 113 may provide VM 112 access to the virtual disk by interfacing with the abstraction of vSAN 115 through vSAN module 114 (e.g., by auto-mounting the top-level file system object 214 corresponding to the virtual disk object 200). For example, vSAN module 114, by querying its local copy of the in-memory metadata database, may be able to identify a particular file system object 205 (e.g., a VMFS file system object in one embodiment, etc.) stored in vSAN 115 that may store a descriptor file 210 for the virtual disk.

Descriptor file 210 may include a reference to composite object 200 that is separately stored in object store 116 and conceptually represents the virtual disk (and thus may also be sometimes referenced herein as a virtual disk object). Composite object 200 may store metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by a user (e.g., an administrator) when creating the virtual disk.

Figure 4:
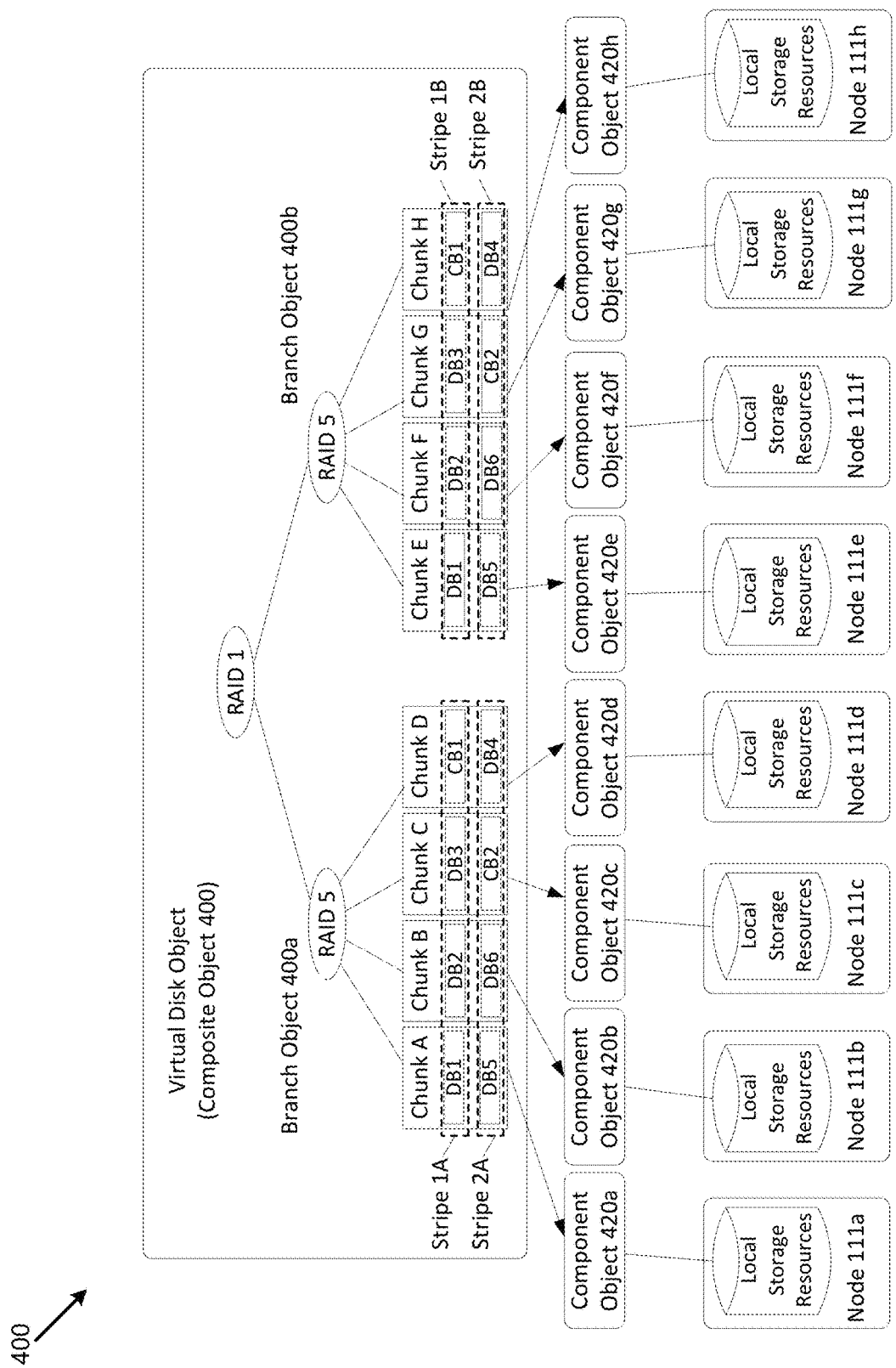
FIG. 4 is a diagram illustrating composite objects of the vSAN being erasure coded and partitioned into multiple stripes, according to an example embodiment of the present application.

Depending on the desired level of fault tolerance or performance efficiency, a virtual disk blueprint 215 may direct data corresponding to composite object 200 to be stored in the datastore in a variety of ways. FIG. 2 shows composite object 200 that includes a virtual disk blueprint 215 describing a RAID 1 configuration where two mirrored copies of the virtual disk (e.g., mirrors) are each further striped in a RAID 0 configuration. Data striping refers to segmenting logically sequential data, such as a virtual disk. Each stripe may contain a plurality of data blocks (e.g., DB1, DB2, DB3 in stripe 1 of composite object 400, as shown in FIG. 4). In some cases, as illustrated in FIG. 4, each stripe may also include one or more code blocks (e.g., RAID 5 or RAID 6). As shown, the stripes are then split vertically into different groups of blocks, referred to as chunks, where each chunk is logically represented as a "leaf" or "component" object to which composite object 200 contains a reference.

As will be described in more detail below, for example with reference to FIG. 5, a stripe, in some embodiments, may also refer to several data and code blocks situated on different rows (may also be called stripes in some embodiments) and columns (may also be called chunks), where each column is associated with a physical disk of a host machine.

The metadata accessible by vSAN module 114 in the in-memory metadata database for each component object 220 provides a mapping to or otherwise identifies a particular node 111 in cluster 110 that houses the physical storage resources (e.g., magnetic disks or slower/cheaper SSD 118, etc.) that actually store the chunk (as well as the location of the chunk within such physical resource).

Figure 3:
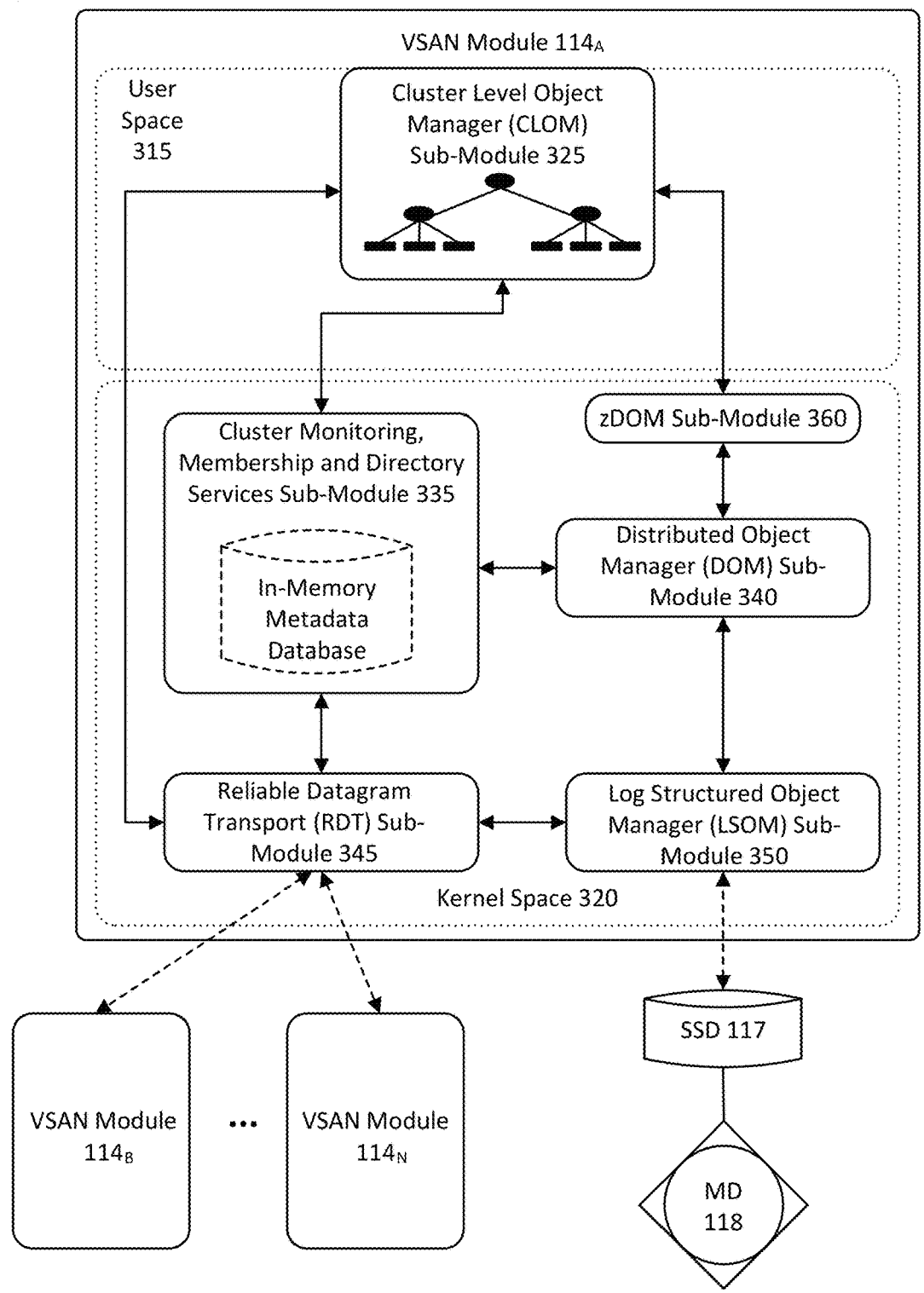
FIG. 3 is a diagram illustrating different components of a vSAN module, according to an example embodiment of the present application.

FIG. 3 is a diagram 300 illustrating different components of a vSAN module, according to an example embodiment of the present application. As previously described, in certain embodiments, vSAN module 114 may execute as a device driver exposing an abstraction of a vSAN 115 to hypervisor 113. Various sub-modules of vSAN module 114 handle different responsibilities and may operate within either user space 315 or kernel space 320 depending on such responsibilities. As depicted in the embodiment of FIG. 3, vSAN module 114 includes a cluster level object manager (CLOM) sub-module 325 that operates in user space 315. CLOM sub-module 325 generates virtual disk blueprints during creation of a virtual disk by a user (e.g., an administrator) and ensures that objects created for such virtual disk blueprints are configured to meet storage profile or policy requirements set by the user. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by a user to the storage profile or policy relating to an object or when changes to the cluster or workload result in an object being out of compliance with a current storage profile or policy.

In one embodiment, if a user creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/chunks of the virtual disk to achieve load balancing, etc.). For example, CLOM sub-module 325, in one embodiment, may be responsible for generating blueprint 215 describing the RAID 1/RAID 0 configuration for virtual disk object 200 in FIG. 2 when the virtual disk was first created by the user. As previously discussed, a storage policy may specify requirements for capacity, IOPS, availability, and reliability. Storage policies may also specify a workload characterization (e.g., random or sequential access, I/O request size, cache size, expected cache hit ration, etc.).

Additionally, the user may also specify an affinity to vSAN module 114 to preferentially use certain nodes 111 (or the local disks housed therein). For example, when provisioning a new virtual disk for a VM, a user may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 may consult the in-memory metadata database maintained by its vSAN module 114 to determine the current state of cluster 110 in order to generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340, for example, through zDOM sub-module 360. The DOM sub-module 340 may interact with object store 116 to implement the blueprint by, for example, allocating or otherwise mapping component objects (e.g., chunks) of the composite object to physical storage locations within various nodes 111 of cluster 110.

In some embodiments, as will be described in more detail below, zDOM sub-module 360 may instruct the DOM module 340 to preliminarily store the data received from the higher layers (e.g., from a VM) in a separate log object on persistent media and a physical memory (e.g., a bank). Once the size of the stored data in the bank reaches a threshold size (e.g., the stripe size), zDOM sub-module 360 may instruct the DOM module to flush the data stored in the bank onto one or more disks (e.g., of one or more host machines). zDOM sub-module 360 may do this full stripe writing to minimize the write amplification effect. In some embodiments, as described below, zDOM sub-module 360 may also modify data compression, hash calculation, data encryption, and other datastore operations to decrease the CPU cost and network and disk write bandwidth.

In addition to CLOM sub-module 325 and DOM sub-module 340, as further depicted in FIG. 3, vSAN module 114 may also include a cluster monitoring, membership, and directory services (CMMDS) sub-module 335 that maintains the previously discussed in-memory metadata database to provide information on the state of cluster 110 to other sub-modules of vSAN module 114 and also tracks the general "health" of cluster 110 by monitoring the status, accessibility, and visibility of each node 111 in cluster 110. The in-memory metadata database may serve as a directory service that maintains a physical inventory of the vSAN environment, such as the various nodes 111, the storage resources in the nodes 111 (SSD, NVMe drives, magnetic disks, etc.) housed therein and the characteristics/capabilities thereof, the current state of the nodes 111 and their corresponding storage resources, network paths among the nodes 111, and the like.

As previously discussed, in addition to maintaining a physical inventory, the in-memory metadata database may further provide a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within vSAN module 114 may access CMMDS sub-module 335 (represented by the connecting lines in FIG. 3) for updates to learn of changes in cluster topology and object configurations.

For example, as previously discussed, during virtual disk creation, CLOM sub-module 325 may access the in-memory metadata database to generate a virtual disk blueprint, and in order to handle an I/O operation from a running VM 112, DOM sub-module 340 may access the in-memory metadata database to determine the nodes 111 that store the component objects (e.g., chunks) of a corresponding composite object (e.g., virtual disk object) and the paths by which those nodes are reachable in order to satisfy the I/O operation. In some embodiments, some or all of the metadata catalog (e.g., the mapping of the object to physical storage locations, etc.) may be stored with the virtual disk object 200 in the object store 116.

As previously discussed, DOM sub-module 340, during the handling of I/O operations as well as during object creation, may control access to, and may handle operations on, those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network (e.g., local area network (LAN), or WAN) with a different DOM sub-module 340 in a second node 111 (or nodes) that serves as the coordinator for the particular component object (e.g., chunk, etc.) of the virtual disk object that is stored in the local storage of the second node 111 (or nodes) and which is the portion of the virtual disk that is subject to the I/O operation.

If the VM issuing the I/O operation resides on a node 111 that is also different from the coordinator of the virtual disk object, the DOM sub-module 340 of the node running the VM may also have to communicate across the network (e.g., LAN or WAN) with the DOM sub-module 340 of the coordinator. In certain embodiments, if the VM issuing the I/O operation resides on a node that is different from the coordinator of the virtual disk object subject to the I/O operation, the two DOM sub-modules 340 of the two nodes may communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 may also similarly communicate amongst one another during object creation (and/or modification). For example, a virtual disk blueprint generated by CLOM module 325 during creation of a virtual disk may include information that designate which nodes 111 should serve as the coordinators for the virtual disk object, as well as its corresponding component objects. The DOM sub-modules 340 for such designated nodes may be issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 may interact with a local storage object manager (LSOM) sub-module 350 that serves as the component in vSAN module 114 that may actually drive communication with the local SSDs and magnetic disks of its node 111. In addition to allocating local storage for component objects (as well as storing other metadata, such as policies and configurations for composite objects for which its node serves as coordinator, etc.), LSOM sub-module 350 may additionally monitor the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 may be used, for example, when DOM sub-modules 340 communicate with one another, as previously discussed above, to create objects or to handle I/O operations. In certain embodiments, RDT module 345 may interact with CMMDS module 335 to resolve the address of logical endpoints dynamically in order to maintain up-to-date location information in the in-memory metadata database, as well as to create, remove, or reestablish connections based on link health status. For example, if CMMDS module 335 reports a link as unhealthy, RDT sub-module 345 may drop the connection in favor of a link in better condition.

In some cases, one or more nodes 111 within node cluster 110 may fail or go offline, resulting in a loss of the data and/or code blocks stored by such nodes. In such cases, the distributed storage system or vSAN environment 100 may have to be able to tolerate such a failure and efficiently reconstruct the missing data blocks. In some other cases, a node 111 may go offline temporarily and then come back online resulting in some out-of-sync data blocks. To address such cases, the distributed storage system may be configured with fault tolerance technologies to resync such out-of-sync data and/or code blocks. Accordingly, to increase performance efficiency and fault tolerance, distributed storage systems (e.g., vSAN environment 100) may implement a variety of fault tolerance technologies, such as the various levels of RAID and/or erasure coding, etc. As described above in relation to FIG. 2, depending on the required level of performance and fault tolerance, virtual disk blueprint 215 may direct composite object 200 to be distributed in one of several ways. In some embodiments, one or a combination of RAID levels (e.g. RAID 0 to RAID 6) may be used, where each RAID level or a combination thereof may provide a different level of fault tolerance and performance enhancement.

Referring back to FIG. 2, for example, FIG. 2 illustrates an example of the application of RAID 1, which entails creating a replica of composite object 200. This is to ensure that a second copy (e.g., branch object 200b) of composite object 200 is still available if a first copy (e.g., branch object 200a) is lost due to some sort of failure (e.g. disk failure etc.). In some embodiments, some objects may require a more robust fault tolerance system (e.g., depending on their level of importance). For example, in one embodiment, the vSAN datastore may store the metadata object (in the performance tier) in a three-way mirror format (e.g., on at least three different disks).

In addition to RAID 1, FIG. 2 also illustrates the application of RAID 0 to the two copies of composite object 200 (branch object 200a and branch object 200b, created as a result of RAID 1). Under RAID 0, each copy of composite object 200 may be partitioned into smaller data stripes, where each stripe is further segmented into a number of data blocks (e.g., DB1, DB2, DB3, in the first stripe, and DB4, DB5, DB6, in the second stripe) and distributed across local storage resources of various nodes in the datastore. In some cases, striping a copy of composite object 200 over local storage resources of various nodes may enhance performance as compared to storing the entire copy of composite object 200 in a single node. This is because striping the data means that smaller amounts of data are written to or read from local storage resources of multiple nodes in parallel, thereby reducing the amount of time to complete a particular read or write operation. However, multiplying the number of nodes used to store the various chunks of data may increase the probability of failure, and thus data loss.

To achieve an even higher level of fault tolerance with much less space usage than RAID 1, erasure coding is applied in some embodiments. Erasure coding (EC) is a method of data protection in which each copy of composite object 200 is partitioned into stripes, expanded and encoded with redundant data pieces, and stored across different nodes of the datastore. For example, a copy of composite object 200 is organized or partitioned into stripes, each of which is broken up into N equal-sized data blocks. Erasure codes are then used to encode an additional M equal-sized code block(s) (interchangeably referred to as "parity blocks") from the original N data blocks, where N is a larger number than M.

The M equal-sized code block(s) then provide fault tolerance and enable reconstruction of one or more lost data blocks in the same stripe should one or more of the underlying nodes fail. More specifically, each code block includes parity values computed from the N data blocks in the same stripe using an erasure coding algorithm. An application of an exclusive OR (i.e., XOR) operation to the N data blocks of the stripe, for computing a code block, is one example of applying an erasure coding algorithm, in which case the computed code block contains the XOR of data corresponding to the N data blocks in the stripe. In such an example, if one of the N data blocks is lost due a failure of its underlying node, the datastore object may be able to be reconstructed by performing an XOR operation of the remaining data blocks as well as the computed code block(s) in the same stripe. Depending on the level of fault tolerance desired, different erasure codes are applied in creating the one or more M code blocks. RAID 5 and RAID 6 are common examples of applying erasure coding and RAID 6 is used for the example embodiments described below, with reference to FIG. 5. In RAID 5, an exclusive OR (i.e. XOR) operation is performed on multiple data blocks to compute a single parity block. An example of the application of RAID 5 in a distributed storage system is illustrated in FIG. 4.

FIG. 4 is a diagram 400 illustrating composite objects of the vSAN being erasure coded and partitioned into multiple stripes, according to an example embodiment of the present application. More specifically, FIG. 4 shows each copy of composite object 400 (i.e., branch object 400a and branch object 400b) being erasure coded with a 3+1 ratio, such that each copy is partitioned into multiple stripes (e.g. stripes 1A-NA, stripes 1B-NB), where each stripe is further broken up into 3 data blocks (N) and 1 code block (M). As shown, the stripes are then split vertically into different groups of blocks, referred to as chunks, where each chunk is logically represented as a component object (e.g., component object 420a) to which composite object 400 contains a reference. As described above, the metadata for each component object then provides a mapping to or otherwise identifies a particular node 111 that has been selected for storing the chunk of blocks corresponding to the component object. Accordingly, each chunk of composite object 400 is stored in a different node (e.g. node 111a through node 111f) based on the mapping of its corresponding component object to the node.

The (3+1) EC ratio, described above, is merely an example and is not intended to limit the scope of the present disclosure. For example, under RAID 5, a smaller or larger number of data blocks, such as 2, 4, 5 or 6 or 10 data blocks, may be used to generate a single code block, resulting in EC ratios of (2+1), (4+1), (5+1), (6+1), or (10+1), etc., respectively. In addition, in some embodiments, each data or code block includes 1 MB of data such that each data stripe comprises 3 MB of data. In other embodiments, the data or code blocks may have other sizes, ranging from 0.1 MB to 10 GB, or higher.

As discussed above, some embodiments may compress the data received in the data blocks, generate metadata that describes the compressed data, and store the compressed data and the associated metadata in the performance tier (e.g., in the MetaObj), as data logs. Some such embodiments may also write the compressed data to a bank which may include one or more physical memories (e.g., of one or more host machines of the hosting system), such as random access memory (RAM). When the compressed data (and the associated metadata) stored in the bank reaches a threshold size, some embodiments may flush the data stored in the bank to the CapObj in the capacity tier. In some embodiments, the threshold size may be equal to the size of a stripe (or segment) that may include several data blocks spread across one or more physical disks of one or more host machines.

In some embodiments, the I/O pattern applied to the MetaObj may be three-way mirroring RAID 1, while the I/O pattern applied to the CapObj may be erasure coding 4+2 RAID 6 having two parity disks. In other words, the performance tier may use a RAID 1 system in some embodiments, while the capacity tier may use a RAID 6 system for storing the data received in the data blocks.

Figure 5:
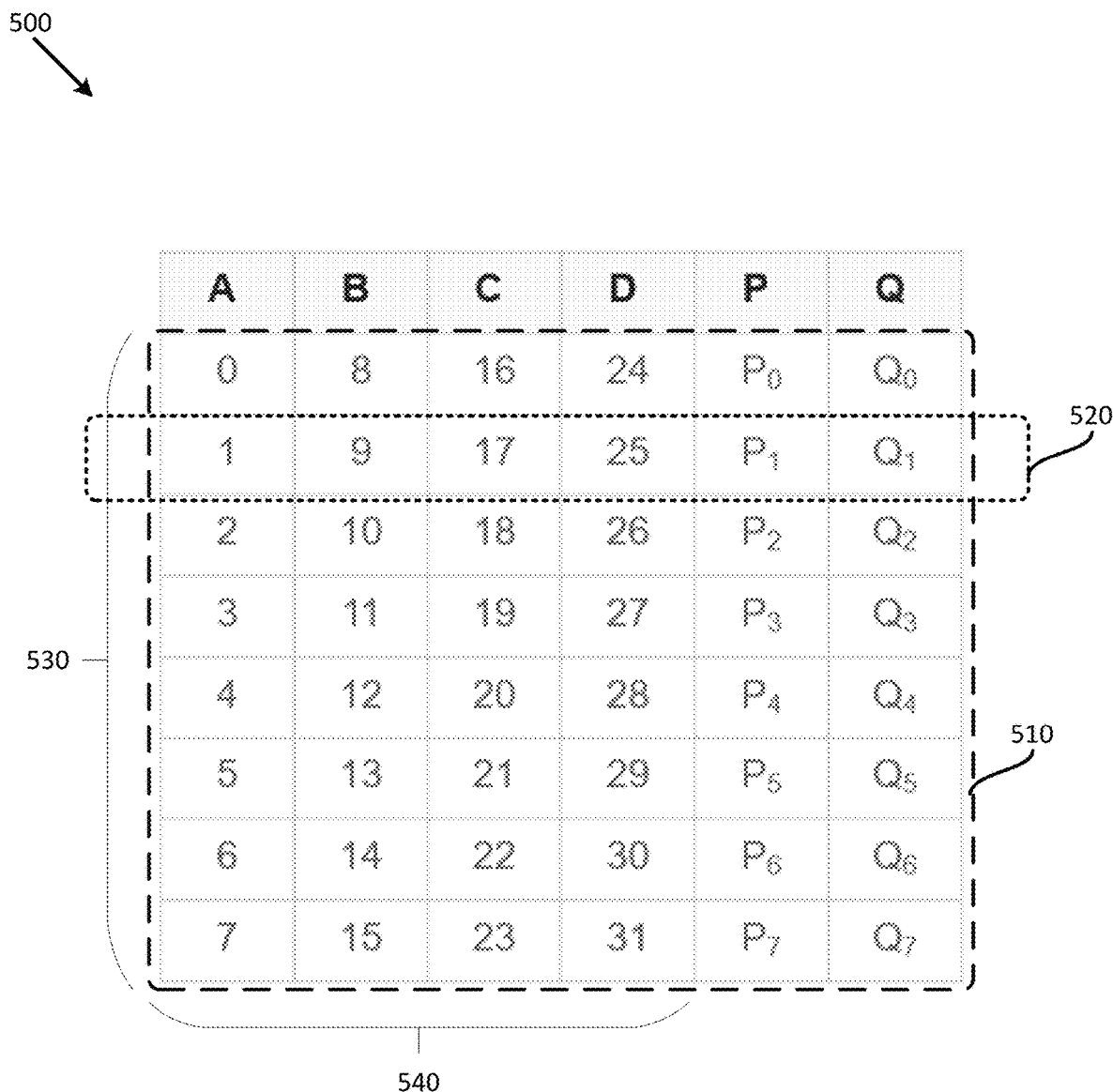
FIG. 5 is a diagram illustrating an example segment of blocks with two parity columns for a RAID 6 storage, according to an example embodiment of the present disclosure.

FIG. 5 is a diagram 500 illustrating an example segment of blocks with two parity columns for a RAID 6 storage, according to an example embodiment of the present disclosure. Specifically, FIG. 5 shows a segment (or stripe) 510 including 6 different columns (e.g., A, B, C, D, P, Q) that are associated with 6 different disks participating in a 4 (data disks)+2 (parity disks) RAID 6. In some embodiments, stripe 510, as shown in the figure, may include a rectangle set of blocks in which four of the columns (i.e., columns A, B, C, and D) may include the data blocks (e.g., blocks 0 to 31) and two of the columns (i.e., columns P and Q) may include the parity blocks (e.g., blocks $P_0$ to $P_7$ and $Q_0$ to $Q_7$) in the RAID 6.

In some embodiments, stripe width 540 may be equal to the number of data disks (e.g., 4 in the illustrated example), while stripe size 530 may be equal to the number of consecutive blocks that are on the same disk (or column, or chunk) before they resume on the next disk (e.g., 8 in the illustrated example). Although in the illustrated example the stripe size is 8 blocks (8×4 kilobytes (KB)=32 KB), the stripe size in some embodiments may reach 1 megabytes (MB) or other values. In some embodiments, the stripe size may be user defined. That is, a user (e.g., an admin) of the datastore may have the option to change the stripe size. Additionally, even though, in the illustrated example, stripe 510 includes all the blocks shown in the figure, a stripe may be as small as covering only the blocks of a row, such as stripe 520.

It should be noted that, in some embodiments, the parity blocks (e.g., in columns P and Q) may rotate to a different disk in the next stripe (not shown in this figure) to ensure the parity disks do not become a bottleneck. Although, as will be described in more detail below, for a full stripe write, the parity rotation may not be as useful as it is for other types of writes (e.g., partial stripe writes). In fact, in some embodiments, when the stripe size is set to be the size of a disk, the parity blocks may not need to be rotated.

In datastores, a write operation (e.g., anytime a block is written) may cause write amplification. The write amplification may differ in different types of writes (e.g., small partial stripe writes, large partial stripe writes, and full stripe writes). In a small partial stripe write, the old content of the to-be-written blocks and parity blocks may be read in order to calculate the new parity blocks, and then the new blocks and the parity blocks may be written. In the illustrated example, if a write on block 8 (i.e., the first block in column/disk B) is required, the datastore may have to read blocks 8, $P_0$ and $Q_0$, and then write the same three blocks. That is, 3 reads and 3 writes may be required which may result in a write amplification of 3 and a network roundtrip of 2.

For a large partial stripe write, the untouched blocks (e.g., blocks that are not needed to be written) in the stripe may be read in order to calculate the new parity blocks, and then the new blocks and the new parity blocks may be written. In the illustrated example, if writes on blocks 3 and 11 (i.e., the fourth blocks in columns A and B) are required, the datastore may have to read blocks 19 and 27, and then write blocks 3 and 11, as well as the parity blocks $P_3$ and $Q_3$. That is, 2 reads and 4 writes may be required which may result in a write amplification of 2 and a network roundtrip of 2.

For a full stripe write, however, the datastore may need to only calculate the new parity blocks (e.g., based on the new blocks that need to be written), and then write the new blocks and the new parity blocks. In the illustrated example, for a full stripe write, the datastore does not need to read any of the blocks and may only calculate the parity blocks for the to-be-written blocks 0-31, and then write all of the data blocks and the calculated parity blocks. That is, no read and 48 writes may be required which may result in a write amplification of 1.5 and a network roundtrip of 1.

As can be seen from the above described examples, a full stripe write may result in the smallest write amplification and network roundtrip. In fact, the bigger the size of a stripe, the more efficient the write operation may become compared to the partial stripe write.

Figure 6:
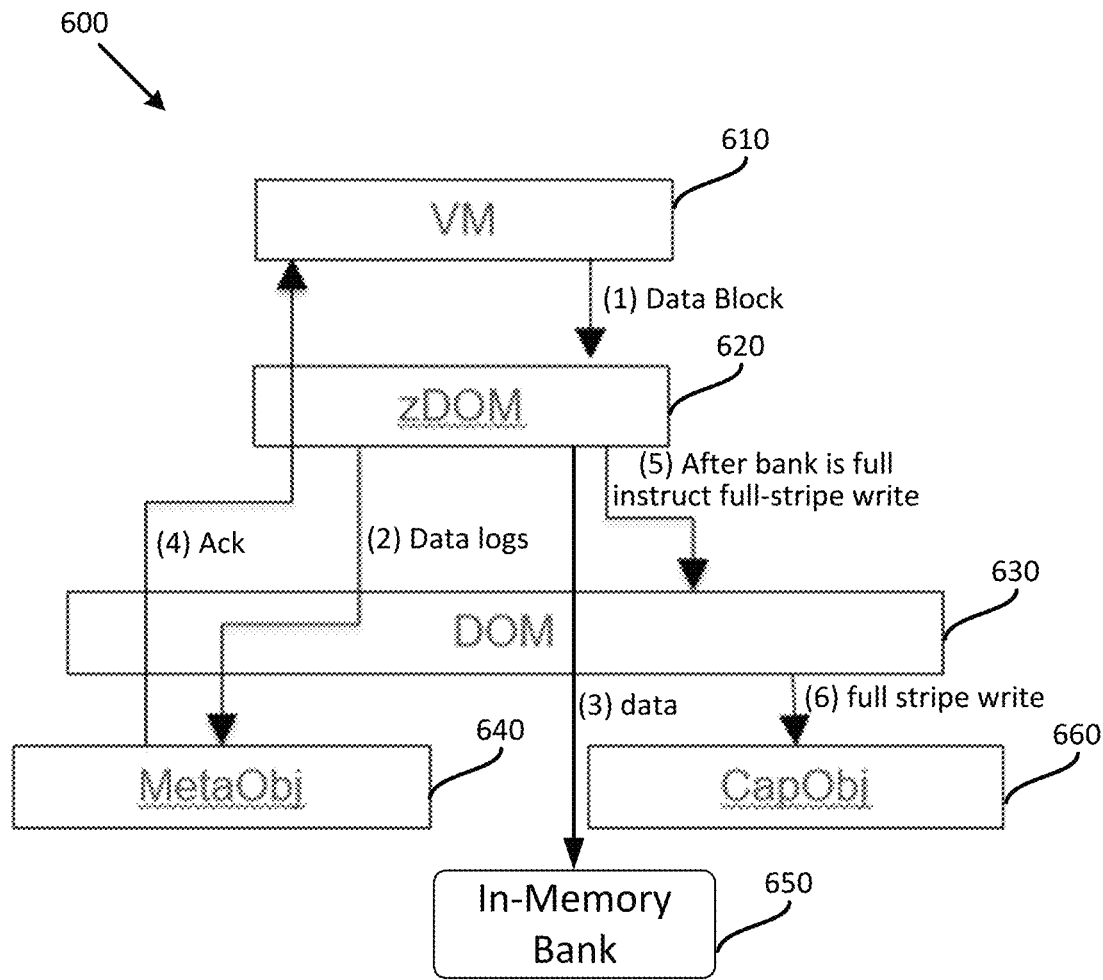
FIG. 6 is a diagram illustrating a datastore module receiving a data block from a VM and storing the data in a MetaObj, CapObj and memory of a hosting system, according to an example embodiment of the present disclosure.

FIG. 6 is a diagram 600 illustrating a datastore module receiving a data block from a VM and storing the data in the MetaObj, CapObj and memory of a hosting system, according to an example embodiment of the present disclosure. In some embodiments, the datastore module may be a vSAN module, such as vSAN module 114 as described above with reference to FIGS. 1-3. In one embodiment, the datastore module may be a zDOM submodule, such as sub-module 360 (illustrated in FIG. 3) that receives a first set of data from a DOM client module and after performing different datastore procedures (e.g., data compression, data encryption, etc.) on the received data, sends a second set of data to a DOM owner module.

In some embodiments, zDOM module 620 may be responsible for caching the received data and writing the cached data as full stipes on one or more disks. In some embodiments, zDOM module 620 may also perform other datastore procedures, such as data compression and hash calculation, which may result in substantial improvements, for example, in garbage collection, deduplication, snapshotting, etc. (some of which may be performed locally by an LSOM submodule, such as LS OM sub-module 350, with reference to FIG. 3).

As shown in FIG. 6, zDOM module 620 may receive a data block from VM 610 to be stored on one or more disks of one or more host machines of a hosting system. zDOM module 620 may then perform some datastore procedures, such as data compression on the received data. For example, zDOM module 620 may compress the data in the data block into a set of one or more sectors (e.g, each sector being 512-byte) and write the set of compressed sectors, as well as metadata about the compressed sectors (e.g., the sectors' sizes, snapshot id, block numbers, checksum of blocks, transaction id, etc.) to a data log maintained in MetaObj 640. In some embodiments, vSAN module 114 (e.g., or zDOM module 620 as part of the vSAN module) may maintain a data log in the MetaObj which may include a set of one or more records, each having a header and a payload for saving, respectively, the metadata and its associated set of compressed sectors. More detail about the data log may be found below, with reference to FIG. 9. In one embodiment, zDOM module 620 may use 3-way mirroring RAID 1 format for writing the data to MetaObj 640.

After the data (e.g., the compressed sectors and their related metadata) is written to the MetaObj 640 successfully, zDOM module 620 may send an acknowledgement to VM 610 letting the VM know that the received data block is successfully stored. As discussed above, the data received (and modified) by zDOM module 620 may also be written to an in-memory bank 650 (e.g., concurrently with the data log) for handling a full stripe write. In some embodiments, when the bank is full (e.g., reaches a threshold capacity that satisfies the full stripe write), the data in the bank may be flushed to the CapObj 660. That is, the stored data in bank 650 may be written sequentially on a full stripe (e.g., the whole segment 510, or stripe 520, as shown in FIG. 5, depending on the full stripe size). In one embodiment, zDOM module 620 may use 4+2 RAID 6 format for writing the data to CapObj 660.

The data flushing may occur, while a new bank (not shown in the FIG. 6) is allocated to accept new writes from zDOM module 620. The number of banks, in some embodiments, may be indicative of how many concurrent writes may happen on a single MetaObj. For example, in one embodiments, with a per disk write size of 128 KB and a stripe width of 4, each bank may have a size of 768 KB (e.g., 512 KB for data and 256 KB for parity blocks) for a full stripe write, and a total size of 1.5 MB memory (e.g., two banks) may be assigned per MetaObj. After flushing the in-memory bank, zDOM module 620 may release (or delete) the associated records of the flushed memory in the data log. This is because when the data stored in the bank is written to the CapObj, the data is in fact stored on one or more physical disks (in the capacity tier) and there is no more need for storing (or keeping) the same data in the data log of the MetaObj (in the performance tier). Consequently, more free space may be created in the data log for receiving new data (e.g., from zDOM module 620).

Figure 7:
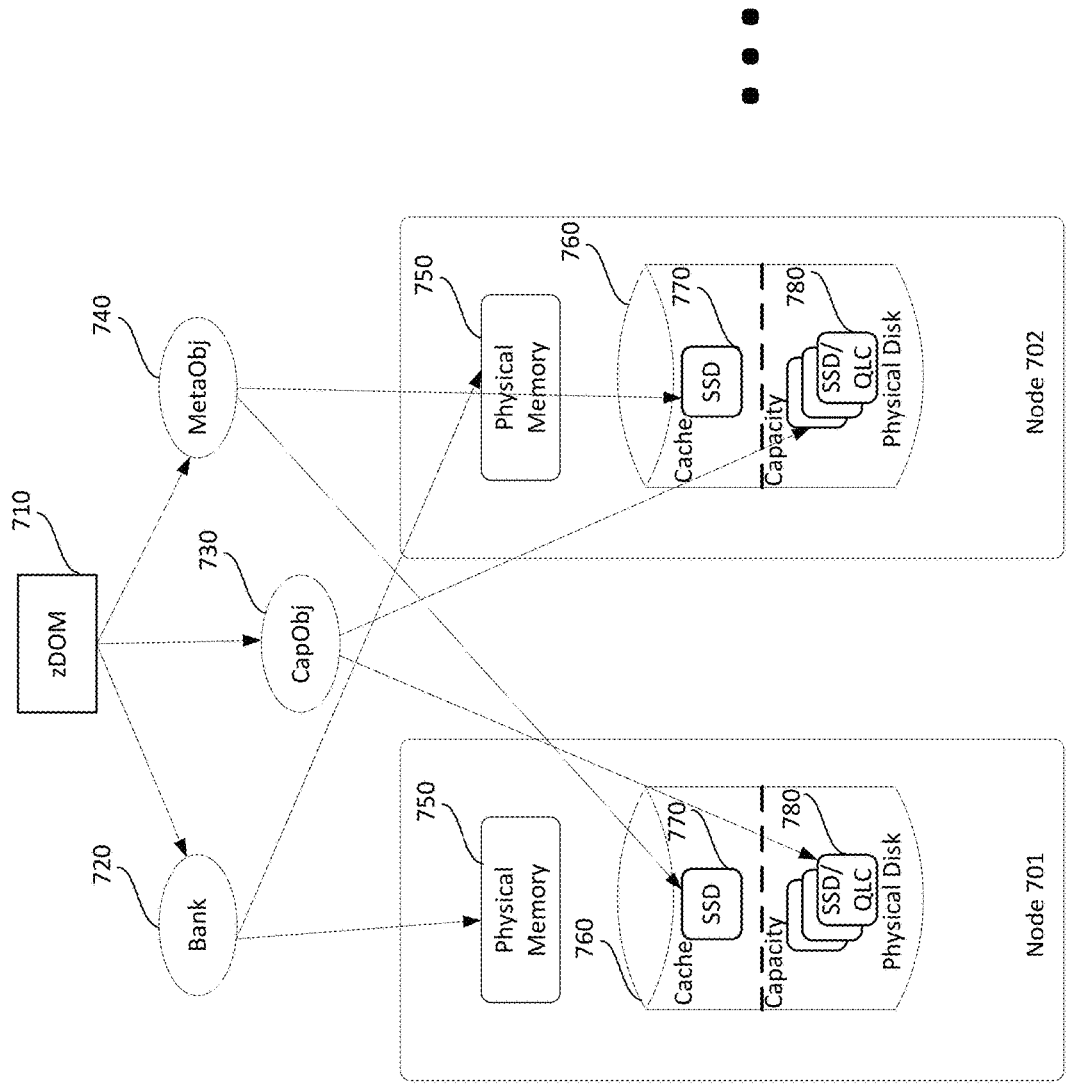
FIG. 7 is a diagram illustrating the relationship between logical objects, such as MetaObj, CapObj and in-memory bank, with physical entities of a hosting system, according to an example embodiment of the present disclosure.

FIG. 7 is a diagram 700 illustrating the relationship between logical objects, such as MetaObj, CapObj and in-memory bank, with physical entities of a hosting system, according to an example embodiment of the present disclosure. Specifically, FIG. 7 shows how data written by zDOM module 710 to logical objects Bank 720, CapObj 730, and MetaObj 740, are stored on different physical memories and disks of at least two different host machines (or nodes) 701 and 702 of a hosting system.

As shown in FIG. 7, each host machine 701 or 702 may include at least a physical memory 750, as well as at least a physical disk 760. Additionally, in some embodiments, a physical disk 760 may be divided into a cache segment and a capacity segment. Cache segment of physical disk 760 may include at least one fast SSD 770 for holding the data written to MetaObj 740. Capacity segment of physical disk 760 may include at least a group of fast SSDs and/or slower TLCs, QLCs, or other types of SSDs 780, for holding the data written to CapObj 730. As such, access to data stored in the cache (e.g., the data log) segment (or the performance tier) may be substantially faster than access to data stored in the capacity segment (or the capacity tier). Some embodiments may use QLC storage in the capacity tier for full stripe writes simply because the write bandwidth in a QLC type of storage may be substantially lower than the read bandwidth (e.g., 400 MB/s to 2200 MB/s) and a QLC storage may be randomly written with 64 KB, or even 128 KB write without causing write amplifications. These attributes make QLC storages a very desirable candidate for a full stripe write which requires a big volume of data being written to the storage at once. Full stripe write also benefits TLC and other types of SSDs because it has lower write amplification. Lastly, as shown in FIG. 7, physical memories 750 (e.g., RAMs) may contain the data written to Bank 720.

In order to write full stripe (or full segment), the vSAN module of some embodiments may always write the data stored in the bank on sequential blocks of a stripe. For example, with reference to FIG. 5, if data is required to be written to blocks 4, 13, 14, and 23, the vSAN module may write the data to block 1, 9, 17, and 25, instead (e.g., when a full stripe size is defined to be the size of stripe 520). In order to always write to sequential blocks, some embodiments may translate the logical block addresses (LBAs) of a DOM client module to physical block addresses (PBAs) of the zDOM module, and then translate the PBAs of the zDOM module to the LBAs of the DOM owners. In other words, the zDOM module LBAs' may map to PBAs that are the same as LBAs of the DOM module functioning beneath the zDOM module. As such, notwithstanding what the LBAs of a write are, the PBAs (e.g., on the physical disks) may always be continuous for the full stripe write.

As described above, the vSAN module may compress the data of the received data blocks into smaller sectors and temporarily store the compressed sectors in an in-memory bank. For example, the vSAN module may compress the data received in a first data block into five different sectors and compress the data received in a second data block into seven different sectors. The vSAN module of some embodiments may record the sizes of the compressed sectors in a logical map. In some embodiments, the logical map may include an LBA to PBA mapping table for determining the real PBAs and the sizes of the sectors stored in the physical blocks. The mapping table, in some embodiments, may include, for each LBA, a corresponding PBA, the number of blocks including the sectors, and the sizes of each block (e.g., the number of sectors in each block).

For example, the vSAN module may store in the logical map a record for an LBA L10, where the corresponding PBA is P200, the number of blocks is 4, and the sizes of the four blocks are 5 sectors, 2 sectors, 8 sectors, and 7 sectors, respectively. If the vSAN module is later required to determine to which PBA the LBA L12 is mapped, by looking at the logical map, the vSAN module may easily determine that the corresponding PBA for LBA L12 may start seven sectors after P200 for eight sectors. This is because L12 is 2 blocks after L10 and as the map indicates, the first two blocks after L10 include a total of seven sectors. Therefore, L12 starts at a physical address that is 7 sectors after P200.

Figure 8:
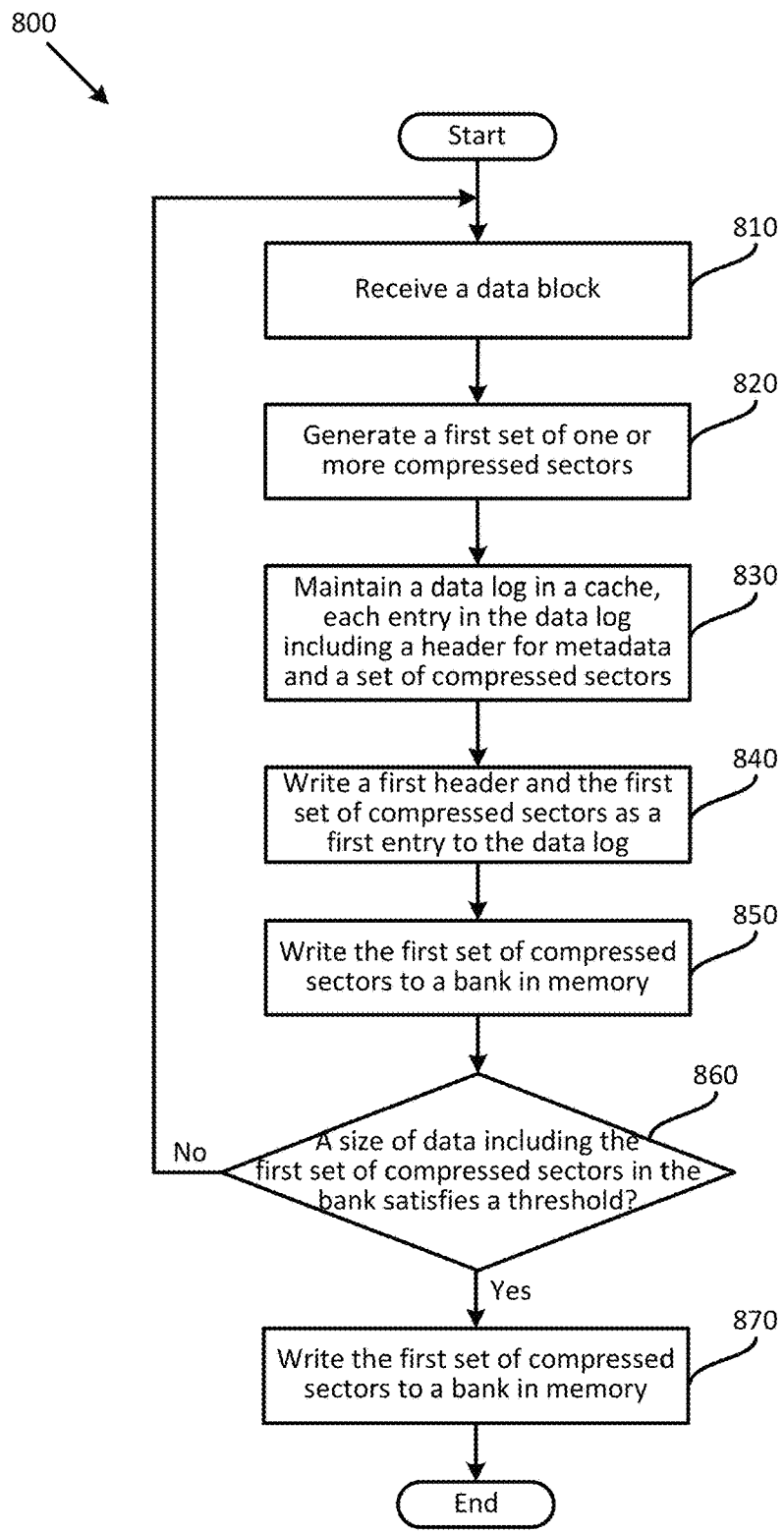
FIG. 8 is a flowchart illustrating a method (or process) for data compression in a full stripe write, according to an example embodiment of the present application.

FIG. 8 is a flowchart illustrating a method (or process) 800 for data compression in a full stripe write, according to an example embodiment of the present application. The method 800 may be performed by a module such as vSAN module 114, as described in FIGS. 1-3 in some embodiments. In some other embodiments, the method may be performed by some other modules that reside in the hypervisor or outside of the hypervisor.

Process 800 may start, at 810, by receiving a data block. As described above, with reference to FIG. 6, the data block may be received from a VM of a hosting system. Process 800 may then generate, at 820, a set of one or more compressed sectors based on the received data block. Process 800 may also generate metadata that describes the set of one or more compressed sectors. For example, the metadata may include, but is not limited to, one or more of the logical and physical block numbers, the compression size, etc., for the generated set of compressed sectors.

Process 800 may also maintain, at 830, a data log in a cache (disk), where each entry of the data log may include a header and a set of compressed sectors. The header in each entry may include the metadata that describes the set of compressed sectors in that entry. Process 800 may write, at 840, a first entry to the data log. The first entry may include (i) a first header that includes the metadata generated for the set of compressed sectors and (ii) the set of one or more compressed sectors. As described above, with reference to FIG. 7, the cache may include one or more physical disks to which the MetaObj that is maintained in the performance tier is mapped. Additionally, writing to the cache (or MetaObj) may include a 3-way mirroring write in which two other mirrored copies of the compressed data (i.e., the data log entry) may be written to multiple disks of multiple hosting machines.

Figure 9:
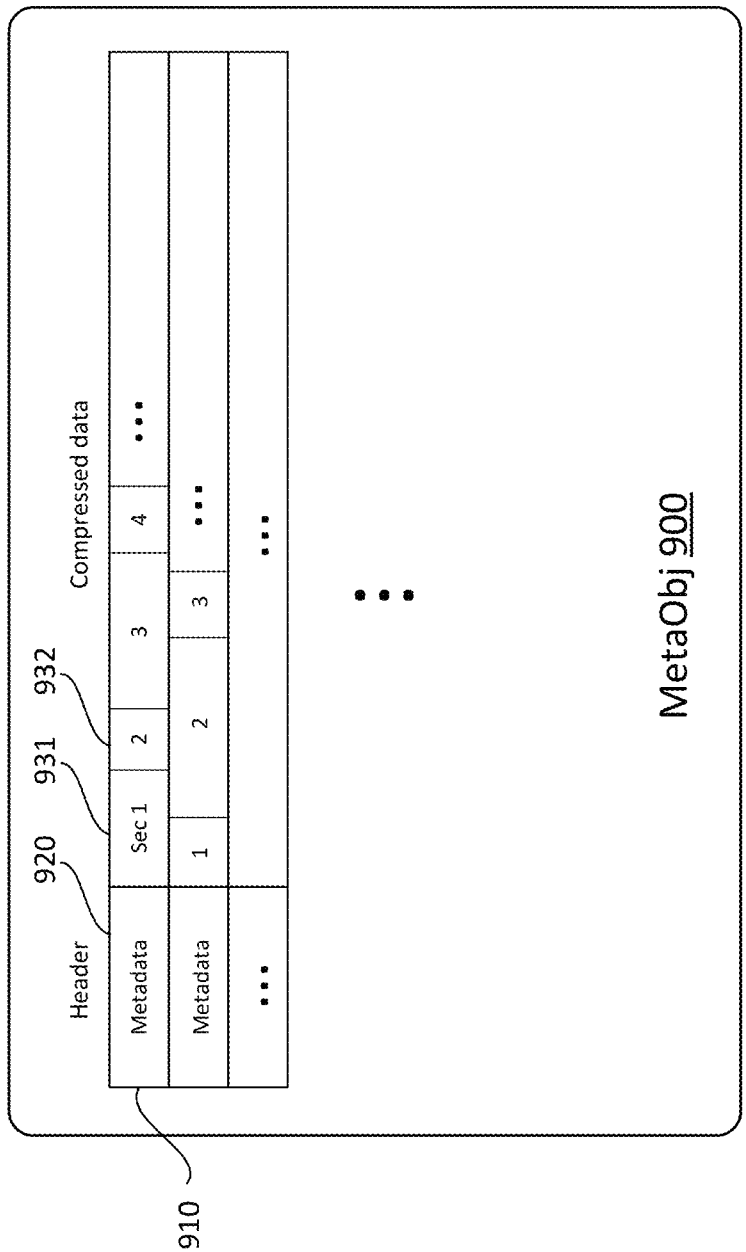
FIG. 9 illustrates a data log of a MetaObj that includes multiple entries, each entry having a header and a payload, according to an example embodiment of the present application.

FIG. 9 illustrates a data log of a MetaObj 900 that includes multiple entries, each entry having a header and a payload, according to an example embodiment of the present application. As illustrated in the figure, the data log has multiple entries that are maintained in the cache (in the performance tier). Each entry in the data log, such as entry 910 may include a header 920 and a payload that includes one or more compressed sectors, such as compressed sectors 931 and 932. The header, in some embodiments, may have a very small size (e.g., 32 bytes, 64 bytes, etc.) and may include metadata (e.g., block numbers, compression sizes, etc.) associated with the compressed sectors in the corresponding payload. Each entry that is written to the data log may include 4 KB of compressed data in some embodiments.

When a data block with a size of 4 KB is received, without compressing the data, the vSAN module may have to write two 4 KBs to the MetaObj. This is because of the addition of a header (even though the size of the header is very small) to the data log entry. With data compression, however, so far as the vSAN module is able to compress the received 4 KB data to seven or less sectors (considering the fact that each block may include 8 sectors), there may remain enough space to add the header to the compressed sectors, and as a result, the vSAN module may write only one 4 KB entry to the data log.

Returning to FIG. 8, process 800 may write, at 850, the set of one or more compressed sectors to a bank in memory. After writing the set of compressed sectors to the bank, the process may determine, at 860, whether a size of data (e.g., stored compressed data) that includes the recently written compressed sectors in the bank satisfies a threshold. The threshold, as described above, may be the size of a full stripe write to the CapObj in the capacity tier in some embodiments.

When the process determines that the size of compressed data accumulated in the bank does not satisfy the threshold, the process may return to action 810, for example, to receive another data block (from the VM). On the other hand, if process 800 determines that the size of compressed sectors in the bank has reached the threshold, the process may flush the bank and write, at 870, the data including the recently written compressed sectors to at least one physical disk in a set of physical disks of a set of host machines (e.g., a full stripe write on stripe 520, with reference to FIG. 5 if the threshold size for a full stripe is defined to be the size of stripe 520, or a full stripe write on stripe 510 if the threshold size for a full stripe is defined to be the size of stripe 510). The process may then end.

In some embodiments, in addition to flushing the bank, as a full stripe, to the CapObj, process 800 may also reserve some of the blocks of the stripe for saving some or all of the metadata related to each data block of the stripe. That is, in some embodiments, process 800 may write the compressed sectors to a set of data blocks of one or more disks, and at the same time, write a segment/stripe summary block to the set of disks.

In one embodiment, the segment summary block may include one or more summary blocks, each of which may be stored at one of the disks and may include metadata (e.g., compression size) about the data blocks of the stripe written on that disk. In some embodiments, the segment summary block may be used for recycling (e.g., offline garbage collection performed by a local LSOM module operating on each disk) or other datastore operations, such as deduplication, checksum and hash calculation, etc., without a need for decompressing the data stored on the disks.

Figure 10:
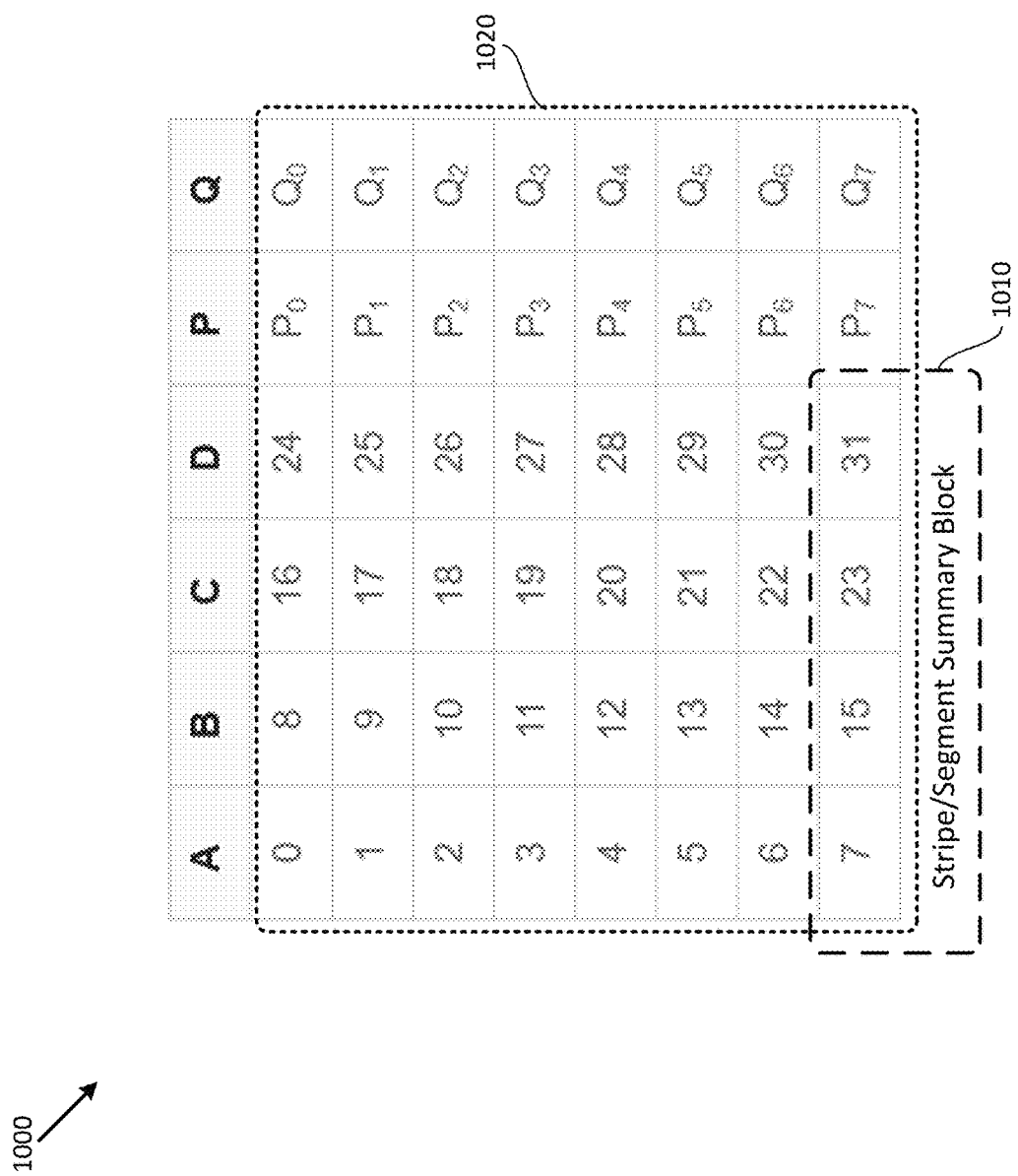
FIG. 10 is a diagram illustrating a segment summary block for a full stripe write in a RAID 6 storage, according to an example embodiment of the present disclosure.

FIG. 10 is a diagram 1000 illustrating a segment summary block for a full stripe write in a RAID 6 storage, according to an example embodiment of the present disclosure. Similar to the stripe shown in FIG. 5, FIG. 10 shows a stripe 1020 having 6 different columns (e.g., A, B, C, D, P, Q) associated with 6 different disks (e.g., of six different hosting machines or nodes) participating in a 4 (data disks)+2 (parity disks) RAID 6. In some embodiments, the stripe may include a set of data blocks (e.g., data blocks 0-31) and a set of parity blocks (e.g., parity blocks $P_0$ to $P_7$ and $Q_0$ to $Q_7$) of the RAID 6.

As described above, when a vSAN module writes a full stripe, the vSAN module may write some (or all) of the metadata (e.g., stored in the corresponding headers of the data log) to the segment summary block 1010, as shown in FIG. 10. For example, when the bank is full (e.g., when the bank reaches the stripe size threshold), the vSAN module may write the compressed blocks (e.g., sets of compressed sectors stored in the bank) 1 to 7 to blocks 0 to 6 of stripe 1020. The vSAN module may also write the metadata associated with each compressed block (e.g., the compressed sizes of the sectors, LBN, etc.) 0 to 6 to the summary block 7. That is, the vSAN module may write the metadata associated with each block of a column of the stripe to a summary block of the same column. In other words, each column of data blocks may have a summary block that is part of a segment summary block of the stripe. Although shown as the last block of each column, in some embodiments, a summary block may be any other one of the blocks in the column, and may rotate in different stripes. A segment summary block (e.g., segment summary block 1010) may include all of the summary blocks of a stripe.

By having the segment summary block, the vSAN module may be able to determine whether the associated data blocks (e.g., containing the compressed sectors) are live or recyclable without decompressing the compressed sectors in the blocks. For example, an LSOM sub-module of the vSAN module that resides on the same node that includes physical disk A may read the summary block 7 (e.g., during an offline garbage collection process) and without decompressing the data blocks, based on the compression sizes of the sectors stored in the metadata of the summary block 7, determine that blocks 3 and 5 in column A include out-of-date data and can be recycled. For example, if the vSAN module determines that block 3 includes an LBA (e.g., based on the LBA of block 3 stored as metadata in summary block 7) that is mapped to a PBA outside the segment (e.g., pointing to a PBA in another segment), the vSAN module may mark block 3 as out-of-date and recyclable. After the recycling (or garbage collection) process, the vSAN module may be able to determine the number of live blocks in the stripe, and if the determined number is less than a threshold, the vSAN module may move the live blocks to another segment to free up the whole stripe for future full stripe writes.

The summary blocks may also be used for other datastore processes, such as deduplication of the data blocks, checksum calculation of the data blocks, hash calculation of the data blocks, etc., without decompression of the corresponding data blocks. As an example, the vSAN module of some embodiments may calculate a cyclic redundancy check (CRC) for each data block the vSAN module receives. For example, with reference to FIG. 6, when zDOM module 620 receives a data block from the VM 610, in addition to compressing the data in the data block, the zDOM module 620 may calculate the CRC for the data and generate a corresponding checksum for the compressed sectors. The zDOM module 620 may then store the checksum in the metadata created for the corresponding compressed sectors, which may be later added to the summary block of a disk where the compressed sectors are stored. As such, the vSAN module may determine the checksum for each block of a disk (e.g., blocks 0 to 6, with reference to FIG. 10) by simply retrieving the metadata from the summary block of the corresponding disk (e.g., the summary block 7).

As described above, by compressing the data in the data log before writing the data as full stripes to the CapObj, some embodiments may reduce the CPU cost significantly, because, for example, less data may be written to the data log, and each mirrored disk may receive and store compressed data, instead of compressing the data individually on each separate disk (after the decompressed mirrored data is saved to the individual disks). Additionally, some embodiments may decrease the network bandwidth and disk I/O substantially, because, for example, less data needs to be transferred and/or exchanged between the different nodes of the hosting system that host the MetaObj and the CapObj.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), NVMe storage, Persistent Memory storage, a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for performing write operations on a set of one or more physical disks of a set of one or more host machines, the method comprising:
   receiving a data block to write on at least two physical disks in the set of physical disks of the set of host machines;
   generating a first set of one or more compressed sectors based on the received data block;
   maintaining a data log in a cache comprising one or more physical disks, each entry of the data log comprising a header and a set of compressed sectors, the header including metadata describing the set of compressed sectors;
   writing a first entry to the data log, the first entry comprising a first header and the first set of one or more compressed sectors;
   writing the first entry to a bank in memory of at least one of the set of host machines;
   determining if a size of data in the bank satisfies a threshold after writing the first entry in the bank; and
   when the size of data in the bank satisfies the threshold, writing the data including the first set of one or more compressed sectors to the at least two physical disks in the set of physical disks of the set of host machines.

2. The method of claim 1, wherein writing the first entry to the data log comprises mirroring the first entry to multiple physical disks without decompressing the first set of one or more compressed sectors.

3. The method of claim 1, wherein writing the data to the at least two physical disks in the set of physical disks of the set of host machines comprises transmitting the data including the compressed sectors to each of the set of host machines.

4. The method of claim 1, wherein the threshold comprises a size corresponding to a full stripe comprising a plurality of data blocks.

5. The method of claim 4, wherein the plurality of data blocks is spread across the set of physical disks in the one or more host machines.

6. The method of claim 5, further comprising:
   generating a stripe summary comprising a set of summary blocks, wherein each summary block is written on one of the set of physical disks and comprises metadata describing compressed blocks written on the one physical disk for the stripe, wherein the metadata describing the compressed blocks comprises a compression size of each block.

7. The method of claim 6, wherein each host machine comprising one of the set of physical disks performs at least one of garbage collection, checksum calculation, or hash calculation without decompressing data blocks in the physical disk using the summary block of the one physical disk.

8. A non-transitory computer readable medium comprising instructions that, when executed by one or more processors of a computing system, cause the computing system to perform operations for performing write operations on a set of one or more physical disks of a set of one or more host machines, the operations comprising:
   receiving a data block to write on at least two physical disks in the set of physical disks of the set of host machines;
   generating a first set of one or more compressed sectors based on the received data block;
   maintaining a data log in a cache comprising one or more physical disks, each entry of the data log comprising a header and a set of compressed sectors, the header including metadata describing the set of compressed sectors;
   writing a first entry to the data log, the first entry comprising a first header and the first set of one or more compressed sectors;
   writing the first entry to a bank in memory of at least one of the set of host machines;
   determining if a size of data in the bank satisfies a threshold after writing the first entry in the bank; and
   when the size of data in the bank satisfies the threshold, writing the data including the first set of one or more compressed sectors to the at least two physical disks in the set of physical disks of the set of host machines.

9. The non-transitory computer readable medium of claim 8, wherein writing the first entry to the data log comprises mirroring the first entry to multiple physical disks without decompressing the first set of one or more compressed sectors.

10. The non-transitory computer readable medium of claim 8, wherein the threshold comprises a size corresponding to a full stripe comprising a plurality of data blocks.

11. The non-transitory computer readable medium of claim 10, wherein the plurality of data blocks is spread across the set of physical disks in the one or more host machines.

12. The non-transitory computer readable medium of claim 11, wherein the operations further comprise:
    generating a stripe summary comprising a set of summary blocks, wherein each summary block is written on one of the set of physical disks and comprises metadata describing compressed blocks written on the one physical disk for the stripe, wherein the metadata describing the compressed blocks comprises a compression size of each block.

13. The non-transitory computer readable medium of claim 12, wherein each host machine comprising one of the set of physical disks performs at least one of garbage collection, checksum calculation, or hash calculation without decompressing data blocks in the physical disk using the summary block of the one physical disk.

14. A computer system, comprising:
    a memory; and
    a processor coupled to the memory, the processor being configured to:
      receive a data block to write on at least two physical disks in a set of physical disks of a set of host machines;
      generate a first set of one or more compressed sectors based on the received data block;
      maintain a data log in a cache comprising one or more physical disks, each entry of the data log comprising a header and a set of compressed sectors, the header including metadata describing the set of compressed sectors;
      write a first entry to the data log, the first entry comprising a first header and the first set of one or more compressed sectors;
      write the first entry to a bank in memory of at least one of the set of host machines;
      determine if a size of data in the bank satisfies a threshold after writing the first entry in the bank; and when the size of data in the bank satisfies the threshold, write the data including the first set of one or more compressed sectors to the at least two physical disks in the set of physical disks of the set of host machines.

15. The computer system of claim 14, wherein writing the first entry to the data log comprises mirroring the first entry to multiple physical disks without decompressing the first set of one or more compressed sectors.

16. The computer system of claim 14, wherein the threshold comprises a size corresponding to a full stripe comprising a plurality of data blocks spread across the set of physical disks in the one or more host machines.

17. The computer system of claim 16, wherein the processor is further configured to:

generate a stripe summary comprising a set of summary blocks, wherein each summary block is written on one of the set of physical disks and comprises metadata describing compressed blocks written on the one physical disk for the stripe, wherein the metadata describing the compressed blocks comprises a compression size of each block.

* * * * *